Patented Sept. 21, 1937

2,093,865

UNITED STATES PATENT OFFICE 2,093,865

FRUIT PRESERVATION

Frank Earl Denny, Yonkers, N. Y., assignor to Boyce Thompson Institute for Plant Research, Inc., Yonkers, N. Y., a corporation of New York No Drawing. Application January 8, 1936, Serial No. 58,164

7 Claims. (Cl. 99—154)

This invention is concerned with the preservation of plant tissue and relates particularly to preserving the original color of cut surfaces of fruits and vegetables. The invention aims to inhibit or retard color changes on cut surfaces of plant tissue for long periods of time.

The cut surfaces of many kinds of plant tissue turn brown in a relatively short time, if exposed to the air or other oxidizing influence. This color change is apparently due to oxidation of some of the plant substances. Some of the oxidation products thus formed are colored and this causes a change in appearance. The brown color which develops on a peeled apple after a short exposure in air is a familiar example.

As a result of my investigations, I have discovered that thioamide substances and compounds (i. e. the sulphur-amino derivatives of carbonic acid) are effective agents for preventing or inhibiting color change on cut surfaces of plant tissue. Among the thioamide substances and compounds which I have found particularly effective are:

Thiocarbamide, $(NH_2CSNH_2)$
Phenyl thiocarbamide $(NH_2CSNHC_6H_5)$
Ortho-tolyl thiocarbamide
    $(CH_3C_6H_4NHCSNH_2)$
Thioacetamide $(CH_3.CS.NH_2)$
Thiosemicarbazide $(NH_2.NHCSNH_2)$ I prefer to employ thiocarbamide, because it is substantially tasteless in the quantities employed and so does not mask or change the taste of plant tissue. Moreover, it is relatively inexpensive, easy to synthesize, and soluble in water.

It is convenient to apply the thioamides and their derivatives in the form of solutions, and preferably in the form of aqueous solutions.

In accordance with my invention I expose freshly cut surfaces of fruit or vegetables to the action of a thioamide, such as thiocarbamide, for a short time, preferably by immersing the fruit or vegetable in a solution containing the thioamide. If desired, the solution may be sprayed upon the surfaces of plant tissue. Thereafter, the plant product thus treated may be kept in the moist state, or it may be desiccated in the conventional way, without danger of serious change in color, even after weeks of exposure in air.

My invention will be more clearly understood in the light of the following preferred practice:

Peeled fruits or vegetables are immersed in an aqueous solution containing about 1 gram of thiocarbamide per liter for one minute, or less. Ordinarily it is sufficient to dip the plant tissue into the solution and remove it at once. The fruit is then removed and allowed to dry. In general, the more rapid the drying, the less the discoloration, but even when the fruits or vegetables so treated are permitted to dry in still air at room temperature, little or no discoloration results.

In accordance with my invention, apples were peeled, cut into eighths, placed in beakers, covered with an aqueous solution containing 1 gram of thiocarbamide per liter, and allowed to remain momentarily. The slices were removed, arranged on filter papers and allowed to dry. Some of the samples were dried in still air at room temperature; others were dried in a current of air at room temperature. Still others were dried in a current of air at 35° centigrade, while the remaining samples were permitted to dry in still air at 50° centigrade. Lighter colored products were obtained when the drying was more rapid.

Aqueous thiocarbamide solutions containing, respectively, 30, 10, 3⅓, 2, 1, ½, and 1/10 grams per liter thiocarbamide effectively prevented discoloration of the apples. Solutions containing 1/100 of a gram of thiocarbamide per liter retarded discoloration, but did not prevent it entirely. Solutions containing ⅕ of a gram of thiocarbamide per liter have proved desirable and economical in that plant tissues treated with them and subsequently dried, have suffered substantially no color change even after exposure to the atmosphere for several weeks.

Satisfactory results were obtained in the treatment of the following varieties of apples:
McIntosh,
Baldwin,
Greening,
Northern Spy,
Stayman Winesap Experiments indicated that an immersion time of substantially less than one minute was generally satisfactory in preventing discoloration, and that no greater effect was obtained when the immersion periods were prolonged over one minute.

Tests conducted in the treatment of pears, bananas, egg plant, figs, and potatoes, as well as many other fruits and vegetables indicated that the thioamides, generally, and thiocarbamide, in particular, were effective in preventing discoloration of practically all fruits and vegetables. In the case of potatoes, however, subsequent desthese plant products may be dried while retaining their original color.

iccation of the potato tissue caused it to turn black. As long as the treated potato tissue remained moist, substantially no discoloration occurred. Most fruits and vegetables may be completely desiccated after treatment in thiocarbamide solutions of appropriate concentration without substantial discoloration.

If the thiocarbamide or other thioamide is removed from the treated surface of fruit or vegetable tissues, discoloration occurs. Apple slices that had been treated with thiocarbamide and then partly dried without discoloration were soaked for one minute in water, and then dried. The soaked slices began to discolor immediately upon drying. This indicates that the thioamide must be present to prevent discoloration, and does not operate by destroying or rendering permanently inactive the constituent which causes discoloration of the plant tissue.

The use of thioamides which are toxic in character or which have an unpleasant taste or odor should be avoided.

Research indicates that thiocarbamide is admirably suited to the practice of my invention because it is relatively non-toxic. Guinea pigs were fed for several months solely with cabbage leaves sprayed thoroughly on both sides with an aqueous solution containing 25 grams per liter of thiocarbamide. The guinea pigs so fed continued to be healthy, and showed the same curve of weight gain as guinea pigs fed on fresh untreated cabbage leaves. Fruit and vegetable salads treated with a .9 G/L solution of thiocarbamide have been consumed by humans periodically for several weeks without ill effect.

My invention is applicable to the preservation of both fresh and dried fruits and vegetables. Thus, fruit salads and the like, wherein fresh plant tissues are exposed, may be preserved for a considerable period of time without discoloration.

Fruits and vegetables which are destined for desiccation should first be treated with thioamide in accordance with my invention. Thereafter, By cut surfaces of plant tissue, I mean surfaces of fruits and vegetables from which the protective layer of skin has been removed so that the flesh of the fruit or vegetable is exposed.

I claim:

1. A process for inhibiting the discoloration of cut surfaces of plant tissue, which comprises exposing the cut surfaces of the plant tissue to the action of a thioamide compound.

2. A process for inhibiting the discoloration of cut surfaces of plant tissue which comprises exposing the cut surfaces of the plant tissue to the action of thiocarbamide.

3. A process for inhibiting the discoloration of cut surfaces of fruits or vegetables which comprises exposing the cut surfaces to the action of an aqueous solution of thiocarbamide.

4. A process for inhibiting the discoloration of the cut surfaces of fruits and vegetables during drying in the presence of oxygen which comprises exposing the cut surfaces to the action of thiocarbamide prior to drying and drying the surfaces in the presence of the thiocarbamide.

5. A process for inhibiting the discoloration of cut surfaces of fruits and vegetables during drying in the presence of oxygen which comprises immersing the cut surfaces in a solution of thiocarbamide prior to drying and drying the surfaces in the presence of the thiocarbamide.

6. A process for inhibiting the discoloration of cut surfaces of plant tissue which comprises exposing the cut surfaces of the plant tissue to the action of a compound selected from the group consisting of thiocarbamide, phenyl thiocarbamide, ortho-tolyl thiocarbamide, thioacetamide and thiosemicarbazide.

7. A process for inhibiting the discoloration of cut surfaces of plant tissue which comprises treating the cut surfaces of the plant tissue with a solution of a compound selected from the group consisting of thiocarbamide, phenyl thiocarbamide, ortho-tolyl thiocarbamide, thioacetamide and thiosemicarbazide.

FRANK EARL DENNY.